United States Patent Office 2,815,361
Patented Dec. 3, 1957

2,815,361

PHOSPHORUS ESTERS

Rupert C. Morris, Berkeley, and John L. Van Winkle, San Lorenzo, Calif., assignors to Shell Development Company, Emeryville, Calif., a corporation of Delaware No Drawing. Application July 20, 1953,
Serial No. 369,214

10 Claims. (Cl. 260—461.105)

This invention relates to new halogen-containing organic compounds of phosphorus. More particularly, the invention relates to new acid halides of halogen-substituted organo-phosphorus acids and to a method for the preparation of the same.

The new acid halides provided by the invention can be represented by the structural formula

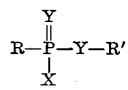

in which R represents a halogen-substituted radical, each Y represents a non-metallic chalcogen element, X represents a middle halogen (that is, bromine or chlorine) and —Y—R' represents the group —Y—R' of an alcohol R'YH. The halogen-substituted organic radical represented by R is substituted by a plurality of atoms of middle halogen (bromine or chlorine) and has a plurality of atoms of middle halogen substituted on the carbon atom that is next to the phosphorus atom, i. e., the alpha carbon atom. The new acid halides thus contain, as the group represented R, an alpha,alpha-polyhalogenoalkyl group and preferably a perhaloalkyl group, at least the halogens on C-1 being middle halogens.

The new acid halides are of particular utility as additives for lubricating oils, by which term there are included lubricating oils of petroleum origin as well as synthetic oils of such types as synthetic esters, e. g., of dicarboxylic acids, polyethers, such as polymers of glycols, and phosphorus-containing oils, such as synthetic phosphorus esters. It was in a sense unexpected to find that the esters of this invention do in fact have such utility. It is, of course, well known that acid halides as a class and including acid halides of phosphorus acids are highly susceptible to hydrolysis, giving rise to acidic hydrolysis products of a corrosive nature. Indeed, corrosivity is a major difficulty that must be avoided in the compounding of a satisfactory lubricating oil, and in a number of cases use of an otherwise potentially valuable lubricating oil additive has been greatly hindered because of its tendency to cause corrosion. The novel acid halides of this invention are quite atypical in respect to their susceptibility to hydrolysis of the acid halide linkage, which has been found to be remarkably stable. The new acid halides, when added to lubricating oils, impart little if any corrosivity to the oils. Furthermore, they impart excellent extreme pressure properties to the oils. The new acid halides can be used in the compounding of extreme pressure oils and greases, suitable for use where high loads approaching seizure loads are imposed on the lubricant film, and they are also useful in break-in oils whereby new engine equipment is first put in operation with special oils designed for better break-in of the engine parts. Other specific compositions wherein the novel compounds of the invention advantageously may be incorporated include without being limited to cutting oils, metal drawing oils, hypoid gear oils, aircraft turbo-lubricants, and the like.

For preparing the acid halides of the present invention there is utilized a series of reactions commencing with condensation or reaction of a trihalomethyl compound with phosphorus trichloride or phosphorus tribromide and aluminum trichloride or aluminum tribromide. The reaction can be represented as follows:

(1) 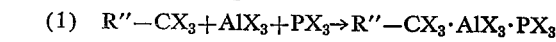

or (2) 

in each of which X represents a middle halogen (bromine or chlorine) and R″ represents hydrogen, an organic group, or a middle halogen. The second of these two equations, both of which refer to the same reaction, describes the product by its probable structure; the reaction may be described in more non-committal terms by Equation 1. The reaction may be carried out by heating the trihalomethyl compound, R″—CX$_3$, the aluminum trihalide, and the phosphorus trihalide together preferably in equivalent amounts and at about 40° to 60° C. Higher or lower temperatures can be employed if desired, for example, temperatures of from about 0° C. to about 100° C. being in general suitable. As the trihalomethyl compound there may be used carbon tetrachloride, carbon tetrabromide, bromotrichloromethane, tribromochloromethane or other perhaloalkanes such as perchlorobutane, perchloroethane, perchlorooctane, perbromopentane, and the like, as well as other trihalomethyl hydrocarbons, such as chloroform, bromoform, methyl chloroform, and higher members, such as are obtained by the free radical initiated addition of carbon tetrachloride or carbon tetrabromide to olefine hydrocarbons, including ethylene, propylene, butylene and amylene and their homologs and analogs. Alkylates of trihalomethyl aldehydes, such as chloral or 3,3,3-trichloropropionaldehyde, with aromatic hydrocarbons such as benzene or toluene or naphthalene may also be used. Inert non-halogen substituents may be present in the trihalomethyl compound although, of course, the unsubstituted and hence the simpler compounds are ordinarily those that are the more readily available and hence to be preferred. Of particular value and interest with respect to the present invention are the complexes of intermediates prepared according to the foregoing equations from carbon tetrachloride and having the probable formula [CCl$_3$PCl$_3$]$^+$[AlCl$_4$]$^-$.

The second reaction of the above-mentioned series of reactions comprises converting the intermediate alpha,alpha - polyhalogenotrihalophosphonium salt represented by the product formulas in Equations 1 and 2 to yield the corresponding alpha,alpha-polyhalogenophosphonic acid dihalide. The reaction can be represented by the equation

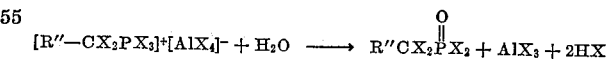

in which R' and X are as hereinbefore. In lieu of water there may be employed H$_2$S, as by passing a stream of H$_2$S gas over the solid alpha,alpha-polyhalogenotrihalophosphonium salt or intermediate complex and before the reaction with the H$_2$S goes to completion hydrolyzing the resulting intermediate to form the corresponding thiophosphonyl dichloride. When hydrolysis is employed temperatures above but near the freezing point of water preferably are used, for example, from about 0° C. to about 20° C., so as to avoid fission of the relatively labile halogen-phosphorus bonds of the alpha,alpha-polyhalogenophosphonyl dihalide.

Reaction of the resulting alpha,alpha - polyhalogenophosphonyl or thiophosphonyl dihalide with an alcohol (preferably in the presence of an acid acceptor, such as pyridine, trimethylamine, benzyltrimethylammonium hydroxide, or the like) or with a corresponding alkali metal alcoholate present in approximately stoichiometric amount results in formation of the desired acid halide of the present invention. These latter reactions may be represented by the following equations:

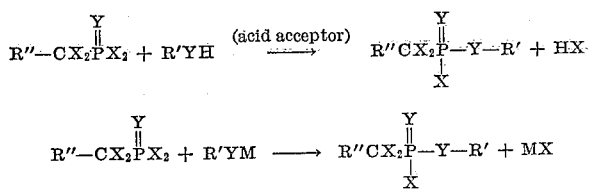

in which R'', X, Y, and R' are as defined hereinbefore and M represents an alkali metal, such as sodium or potassium. As the alcohol (or corresponding alcoholate) there can be used any of the relatively low molecular weight alcohols, such as methanol, ethanol, isopropyl alcohol, butanol, 2-ethylhexyl alcohol, decyl alcohol, oxo alcohols, as well as the corresponding thioalcohols, or mercaptans. The aromatic alcohols can also be used, including those where the hydroxyl or mercapto group is substituted on a side chain, i. e., bonded to non-aromatic carbon, such as benzyl alcohol, cinnamyl alcohol, 3-phenyl-1-mercaptopropane, and beta-ethanol naphthalene, as well as those where the hydroxyl or mercapto group is directly bonded to aromatic carbon, such as phenol, cresol, naphthol, bis-phenol A, thiophenol, and the like.

The reaction of the alpha,alpha-polyhalogenophosphonyl dihalide or alpha,alpha-polyhalogenothionophosphonyl dihalide with the alcohol or alcoholate may be carried out conveniently by mixing the reactants in solution in an inert solvent such as benzene, isooctane, chlorobenzene, or the like, and allowing the reaction to proceed. The reactants are employed in substantially stoichiometric proportions, an equivalent amount of the acid acceptor being added if an acid acceptor is employed. The reaction proceeds readily at temperatures between about 0° C. and about 25° C., although higher temperatures may be used if desired. The amine hydrohalogenide which forms by reaction between the acid acceptor and the hydrohalic acid that is formed in the reaction, or the alkali metal halide that is formed when the alcohol is used in the form of an alkali metal alcoholate, may be removed from the reaction mixture as by filtration after the reaction is completed, and the desired alpha,alpha-polyhalogenophosphonyl monohalide that is formed by the reaction may be recovered by fractional distillation or equivalent means.

The following examples will serve to illustrate the invention. It will be appreciated, of course, that the invention has other specific embodiments than those chosen for illustrative purposes, and that the examples herein are in no sense of the word intended to be restrictive of the scope of the invention.

*Example I*

Carbon tetrachloride, aluminum trichloride, and phosphorus trichloride and mixed in equimolar quantities and the mixture is held with stirring at about 40° C. for two hours. Unconsumed carbon tetrachloride and phosphorus trichloride are stripped from the resulting trichloromethyltrichlorophosphonium aluminum tetrahalide salt (obtained in a yield about 96% of theory), and the trichloromethyltrichlorophosphonium salt is crystallized from methylene chloride solution. Three hundred parts by weight of the purified salt then are added rapidly to a stirred mixture of 710 parts by weight of ice, 237 parts by weight of concentrated hydrochloric acid (d.=1.2), and 1060 parts by weight of methylene chloride. The reaction mixture is held with stirring at about −5° C. to about 0° C. for about 30 minutes and the aqueous phase then is decanted off and the methylene chloride flash evaporated from the remaining organic phase. The residue, about 167 parts by weight of trichloromethanephosphonyl dichloride, is purified by sublimation to yield colorless crystalline trichloromethanephosphonyl dichloride. To about 235 parts by weight of the trichloromethylphosphonyl dichloride in about 450 parts by weight of benzene at 0° C. there is added a solution of one equivalent each (based on the trichloromethylphosphonyl dichloride) of n-butanol and triethylamine in benzene. After an initial reaction period at 0 to 3° C., the mixture is warmed to 40° C., to complete the reaction. Butyl trichloromethylphosphonyl chloride is obtained as a water-white liquid boiling at about 85° C. under 0.6 mm. mercury pressure by filtering the reaction mixture, washing the filtrate with water, and fractionally distilling. The product thus prepared is characterized approximately as follows: specific gravity (*d* 20/4) 1.4194; refractive index' (*n* 20/D) 1.4820; analyzed composition 11.3% P, 21.9% C, 3.28% H, and 51.8% Cl; composition calculated from formula 11.4% P, 22.9% C, 3.8% H, and 51.7% Cl. The formula of this product can be written as follows:

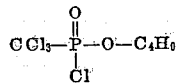

*Example II*

Amyl trichloromethylthiolophosphonyl chloride is obtained in a manner similar to that used in Example I except that amyl mercaptan is employed instead of n-butanol. The structural formula of amyl trichloromethylthiolophosphonyl chloride can be written as follows:

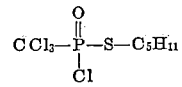

*Example III*

Carbon tetrabromide is employed in place of carbon tetrachloride in the procedure illustrated in Example I. The product which is obtained is butyl tribromomethylphosphonyl bromide having the formula

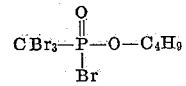

*Example IV*

An aryl trichloromethylphosphonyl halide can be prepared by substituting phenol or a substituted phenol for the n-butanol employed in Example I or by using a sodium phenolate. In the latter case, the acid acceptor becomes superfluous since acid is not liberated, and can accordingly be dispensed with. An illustrative aryl trichloromethylphosphonium halide of the invention is p-chlorophenyl trichloromethylphosphonyl chloride, prepared from p-chlorophenol and trichloromethylphosphonyl dichloride and having the structure represented by the formula

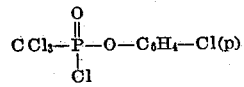

The corresponding bromo compound, p-chlorophenyl tribromomethylphosphonium bromide, can be prepared similarly.

*Example V*

For the preparation of thiono compounds of the present invention, a quantity of the complex or intermediate salt formed by reaction of the trichloromethyl organic reactant, the aluminum trichloride or tribromide, and the phosphorus trichloride or tribromide is placed in a suitably positioned reaction tube and subjected to the action of a slow stream of hydrogen sulfide gas for about 6 to 10 hours, and the resulting product is hydrolyzed by dissolving it in methylene chloride and adding a small amount of water to the solution. The resulting alpha, alpha-polyhalogenoalkylphosphonyl dichloride then may be treated, with or without preceding isolation, with an alcohol or an alcoholate to yield the desired alkyl or aryl alpha,alpha - polyhalogenoalkylthionophosphonyl halide. An illustrative product of this procedure is decyl trichloromethanethionophosphonyl chloride, of the structure

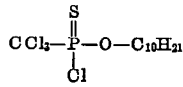

The phenyl, hexylthiolo, and amyl esters can be prepared similarly.

*Example VI*

Into a 2-liter 4-necked flask equipped with a mechanical stirrer, reflux condenser, thermometerwell, and dropping funnel are uplaced 237 parts (1 mole) trichloromethanephosphonic dichloride and 530 parts of benzene. The reactants are cooled to 0° C. by means of a cooling bath and a solution of 84 parts (1 mole) phenol, 101 parts (1 mole) triethylamine, and 175 parts of benzene is slowly dropped in during thirty-five minutes maintaining the reaction temperature at 0–8° C. The reaction mixture then is heated at 40° C. for one-half hour. The reaction mixture is filtered to remove the salt and the filtrate is washed with water and distilled through a falling film molecular still. There is recovered 158 parts (0.537 mole) monophenyl trichloromethanechlorophosphonate, a water-white liquid boiling at about 48–49° C. at 0.018 mm. and having a refractive index (*n* 20/D) of about 1.5472. Analyses: found, 28.2% C, 2.3% H, 48.1% Cl, and 10.5% P; calculated, 28.5% C, 1.70% H, 48.3% Cl, and 10.53% P. The formula for this product can be written as follows:

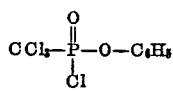

*Example VII*

A mixture of 237 parts trichloromethanephosphonic dichloride and 530 parts benzene is cooled at 10° C. and there is slowly added, while maintaining the temperature at about 10° C., a mixture of 186 parts lauryl alcohol, 101 parts triethylamine and 175 parts benzene. The mixture is held at about 10° C., with stirring, and then warmed to 40° C. for one-half hour. The precipitated triethylamine hydrochloride is removed by filtration, the filtrate is washed with water and the benzene is removed from the washed filtrate by flash evaporation. The crude product remaining is distilled in a falling film molecular still to recover the dodecyl trichloromethane chlorophosphonate. Boiling point 92° C. under 0.019 mm. mercury. Refractive index (*n* 20/D) 1.4802. The structural formula for dodecyl trichloromethanechlorophosphonate can be written as follows:

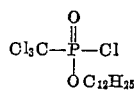

*Example VIII*

A mixture of 237 parts of trichloromethanephosphonic dichloride and 525 parts of benzene was cooled to 0 to 5° C. and there then was added a chilled mixture of 90 parts n-butyl mercaptan, 101 parts triethylamine and 175 parts benzene. The mixture then was heated one-half hour at 40 to 45° C., at the end of the heating period the triethylamine hydrochloride which had formed and precipitated was filtered off and the filtrate was washed several times by shaking with water. The benzene was flash evaporated from the washed filtrate and the residue from the evaporation was distilled through a falling film molecular still. S-butyl trichloromethanethiochlorophosphonate was obtained as a clear colorless liquid distilling at 86 to 89° C. under 0.025 mm. mercury. Refractive index (*n* 20/D) 1.5329. Analyses: found, 11.7% P and 11.4% S; calculated, 10.7% P and 11.05% S. The formula for this product can be written as follows:

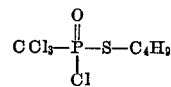

Although primarily useful as lubricating oil additives, it will be realized that the utility of the new compounds of this invention is not correspondingly limited. The new compounds can be used as chemical intermediates, from which, for example, useful diesters can be synthesized, as fireproofing agents for cloth, wood, felt, and the like, in or for the preparation of resins and plastics, as intermediates for the synthesis of agricultural chemicals, such as fungicides and insecticides, and as toxicants in and of themselves.

We claim as our invention:

1. An alkyl alpha,alpha-polychloroalkylphosphonyl chloride.
2. An alkyl alpha,alpha-polybromoalkylphosphonyl bromide.
3. An aryl alpha,alpha-polyhalogenoalkylphosphono halide, the halogens whereof are selected from the group consisting of chlorine and bromine.
4. An alkyl trichloromethylphosphonyl chloride.
5. An aryl trichloromethylphosphonyl chloride.
6. Butyl trichloromethylphosphonyl chloride.
7. Phenyl trichloromethylphosphonyl chloride.
8. An acid halide of phosphorus having the structure represented by the formula

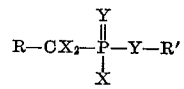

in which R is selected from the group consisting of hydrogen, chlorine, bromine, alkyl, chloro-substituted alkyl, and bromo-substituted alkyl radicals; Y represents a member of the group consisting of oxygen and sulfur; X is selected from the group consisting of chlorine and bromine radicals; and R' represents a hydrocarbon radical of the group consisting of alkyl, phenyl-substituted lower alkyl, naphthyl-substituted lower alkyl, and the phenyl radicals and naphthyl radicals.

9. An alkyl trihalomethylthionophosphonyl halide, the halogens whereof are selected from the group consisting of chlorine and bromine.
10. An alkyl trihalomethylthiolophosphonyl halide, the halogens whereof are selected from the group consisting of chlorine and bromine.

References Cited in the file of this patent

UNITED STATES PATENTS

| | | |
|---|---|---|
| 2,573,568 | Harman et al. | Oct. 30, 1951 |
| 2,674,616 | Morris | Apr. 6, 1954 |

OTHER REFERENCES

Kabachnik: Chem. Abst., vol. 45, page 10191b–1951.